United States Patent [19]
Aleksic

[11] Patent Number: 6,084,591
[45] Date of Patent: Jul. 4, 2000

[54] METHOD AND APPARATUS FOR DEFERRED VIDEO RENDERING

[75] Inventor: Milivoje M. Aleksic, Richmond Hills, Canada

[73] Assignee: ATI Technologies, Inc., Thornhill, Canada

[21] Appl. No.: 08/840,400

[22] Filed: Apr. 29, 1997

[51] Int. Cl.[7] .................................................. G06T 15/40
[52] U.S. Cl. ..................... 345/422; 345/423; 345/429; 345/430; 345/433; 345/440
[58] Field of Search .................................. 345/422, 418, 345/423, 429, 430, 433, 440

[56] References Cited

U.S. PATENT DOCUMENTS

| | | | |
|---|---|---|---|
| 4,961,153 | 10/1990 | Fredrickson et al. | 345/422 |
| 5,517,603 | 5/1996 | Kelley et al. | 345/422 |
| 5,835,096 | 11/1998 | Baldwin | 345/430 |
| 5,856,829 | 1/1999 | Gray, III et al. | 345/422 |

*Primary Examiner*—Mark R. Powell
*Assistant Examiner*—Kimbinh T. Nguyen
*Attorney, Agent, or Firm*—Markison & Reckamp, PC.

[57] ABSTRACT

A method and apparatus for deferred rendering of pixel information is accomplished by receiving at least a portion of an object element list (Eg. triangle descriptor list) which contains object element descriptor information for each object to be displayed on at least a portion of the display. Upon receiving this information, z-components of each object element (Eg. triangle) is compared with the other object elements based on pixel location. As the comparisons are being made, the identity of an object element that is visible at a particular pixel location (Eg. in the foreground with respect to other objects) is stored in a manner that corresponds with the particular pixel location. Once the z-components for all of the object elements have been compared, the object elements identified in the memory have pixel information generated therefor.

16 Claims, 7 Drawing Sheets

Figure 3

METHOD AND APPARATUS FOR DEFERRED VIDEO RENDERING

TECHNICAL FIELD OF THE INVENTION

This invention relates generally to video graphics processing and more particularly to deferred rendering of pixel information.

BACKGROUND OF THE INVENTION

Video graphics circuits are known to generate pixel information for objects to be displayed on a computer screen, monitor, or television. The source for the object may be television broadcasts, cable television transmissions, satellite television transmissions, computer programs, video games, web pages, and so on. For computer screens, video graphics circuits partition each object to be displayed into triangles. Each triangle is stored as three vertexes and corresponding display parameters for each vertex. The corresponding display parameters include color parameters (Red, Green, Blue), display, or pixel, location parameters (x, y, z), and texture parameters (S, T, W).

From the corresponding display parameters, a video graphics circuit calculates slopes and associated display parameters for each point within the triangle based on the slopes and corresponding display parameters. The slopes and associated display parameters are stored in a triangle descriptor list, which is subsequently used to calculate pixel information.

When only one two dimensional object, or one triangle, is to be displayed, there are no unnecessary steps to the process described above. When more than one object is to be displayed and the objects overlap, there are unnecessary steps because pixel information is calculated for each triangle of each object. When all the pixel information for each object is calculated, a comparison is performed to determine which object is in the foreground. For the object that is in the background with respect to another object, the pixel information for the portion of the object that is overlapped is discarded. Thus, the calculation of such pixel information was unnecessary and adversely affects the efficiency of the video graphics circuit.

If only a small portion of an object is overlapped, the amount of unnecessary pixel information calculation is minimal and has little adverse affects on the efficiency of the video graphics circuit. If, however, the object has a substantial overlap portion, then the number of unnecessary calculations increases and the efficiency of the video graphics circuit is affected. The problem is compounded when there are several objects that overlap, where only one of them will be in the foreground and displayed in its entirety. For example, assume that several faces are to be displayed and they overlap. To begin the display process, the video graphics circuit calculates the slopes and associated display parameters for each triangle of a face, which includes up to 20,000 triangles, and stores the values in the triangle descriptor list. Next, the video graphics circuit calculates pixel information for a face based on the information in the triangle descriptor list and stores the pixel information. The process is repeated for each face to be displayed. Once all of the pixel information is generated, the video graphics circuit compares z-components of the faces to determine which one is in the foreground in the overlap areas.

As such, all the calculations to obtain the pixel information in the overlap portions of the objects not in the foreground is unnecessary, adversely affecting the efficiency of the video graphics circuit. Therefore, a need exists for a method and apparatus that avoids unnecessary pixel information calculation and thereby improving the efficiency of video graphics circuits.

BRIEF DESCRIPTION OF THE DRAWINGS

FIG. 3 illustrates a graphical representation of data stored in the second and third memories of the deferred video rendering system of FIG. 2;

DETAILED DESCRIPTION OF THE DRAWINGS

Generally, the present invention provides a method and apparatus for deferred rendering of pixel information. This may be accomplished by receiving at least a portion of an object element list (Eg. triangle descriptor list) which contains object element descriptor information for each object to be displayed on at least a portion of the display. Upon receiving this information, z-components of each object element (Eg. triangle) is compared with the other object elements based on pixel location. As the comparisons are being made, the identity of an object element that is visible at a particular pixel location (Eg. in the foreground with respect to other objects) is stored in a manner that corresponds with the particular pixel location. Once the z-components for all of the object elements have been compared, the object elements identified in the memory have pixel information generated therefor. With such a method and apparatus, unnecessary pixel information calculations are avoided by first determining which objects and portions of objects will be visible when displayed. Having made this determination, pixel information is calculated for only the objects and portions thereof that will be displayed, thereby avoiding unnecessary pixel information calculations and the resulting adverse affects to the efficiency of video graphics circuits.

Figure 1:
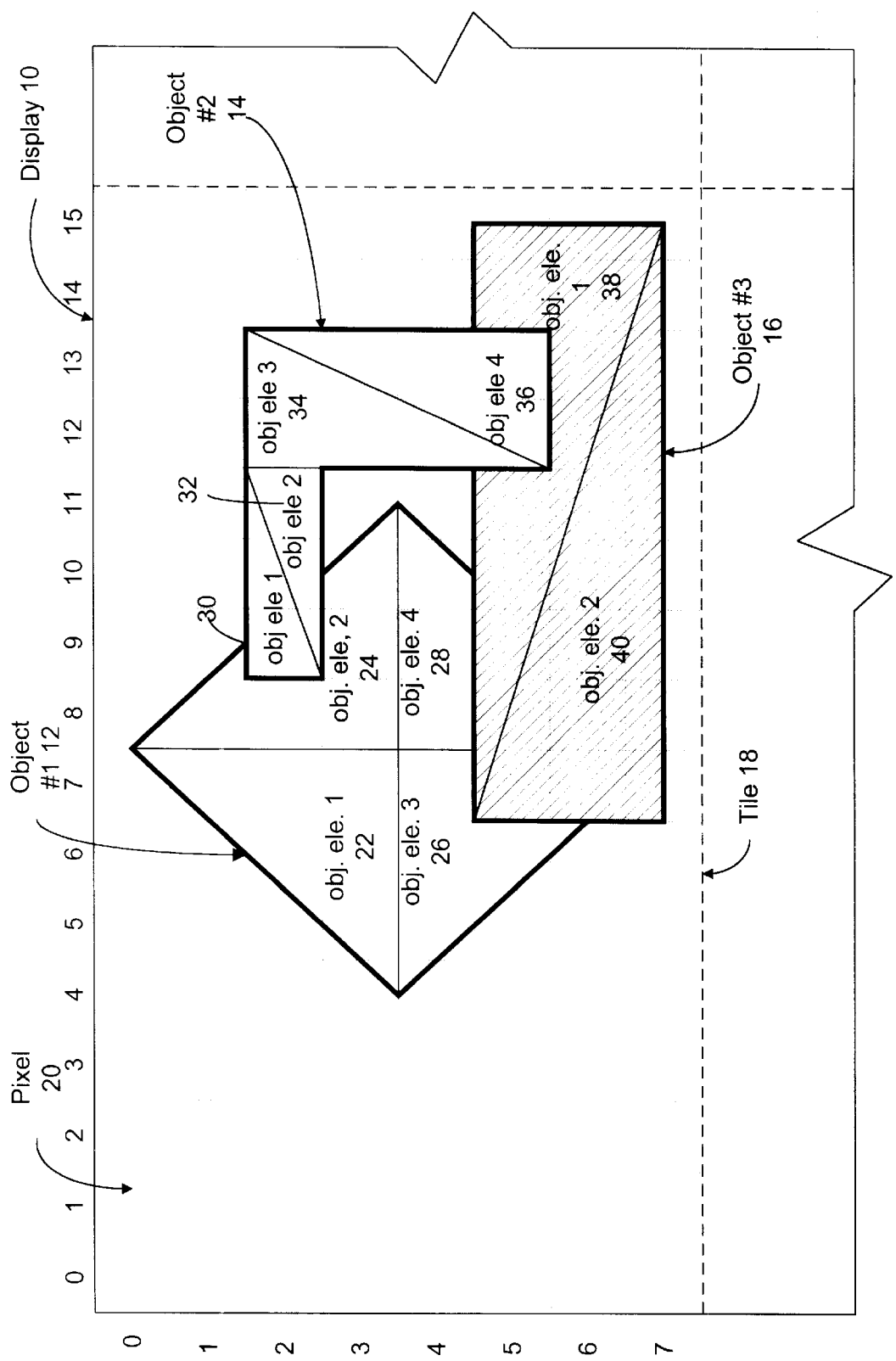
FIG. 1 illustrates a graphical representation of three objects overlapping on a portion of a display in accordance with the present invention.

The present invention can be more fully described with reference to FIGS. 1 through 7. FIG. 1 illustrates a graphical representation of three objects 12, 14, 16 overlapping on a portion of a display 10. The display 10 is partitioned into portions or tiles 18, wherein a tile 18 is comprised of a plurality of pixels 20. Tile 18 is shown to include sixteen by eight pixels 20. The objects 12, 14, and 16 each include a plurality of object elements. Object #1 12 includes four object elements 22–28; object #2 includes four object elements 30–36; and object #3 includes 2 object elements 38 and 40. Note that an object element may have any polygonal shape, but for the purposes of this example, the object elements will be shown as triangles.

In this illustration, object #2 14 is shown in the foreground with respect to objects #1 and #3, where object #3 overlaps object #1. The remaining area of tile 18 is background pattern, which may be any type of background associated with computer displays and/or particular applications that created the objects #1–#3. Note that the edges of object #1 will not be as smooth as shown since the pixels create the edges of the objects, but are shown to be smooth for the purposes of this discussion. Also note that a computer display typically has a pixel arrangement of 640 pixels by 480 pixels. Thus, the sixteen by eight pixel example presented is a very small portion of the display, and a tile may be much bigger than the one shown.

Figure 2:
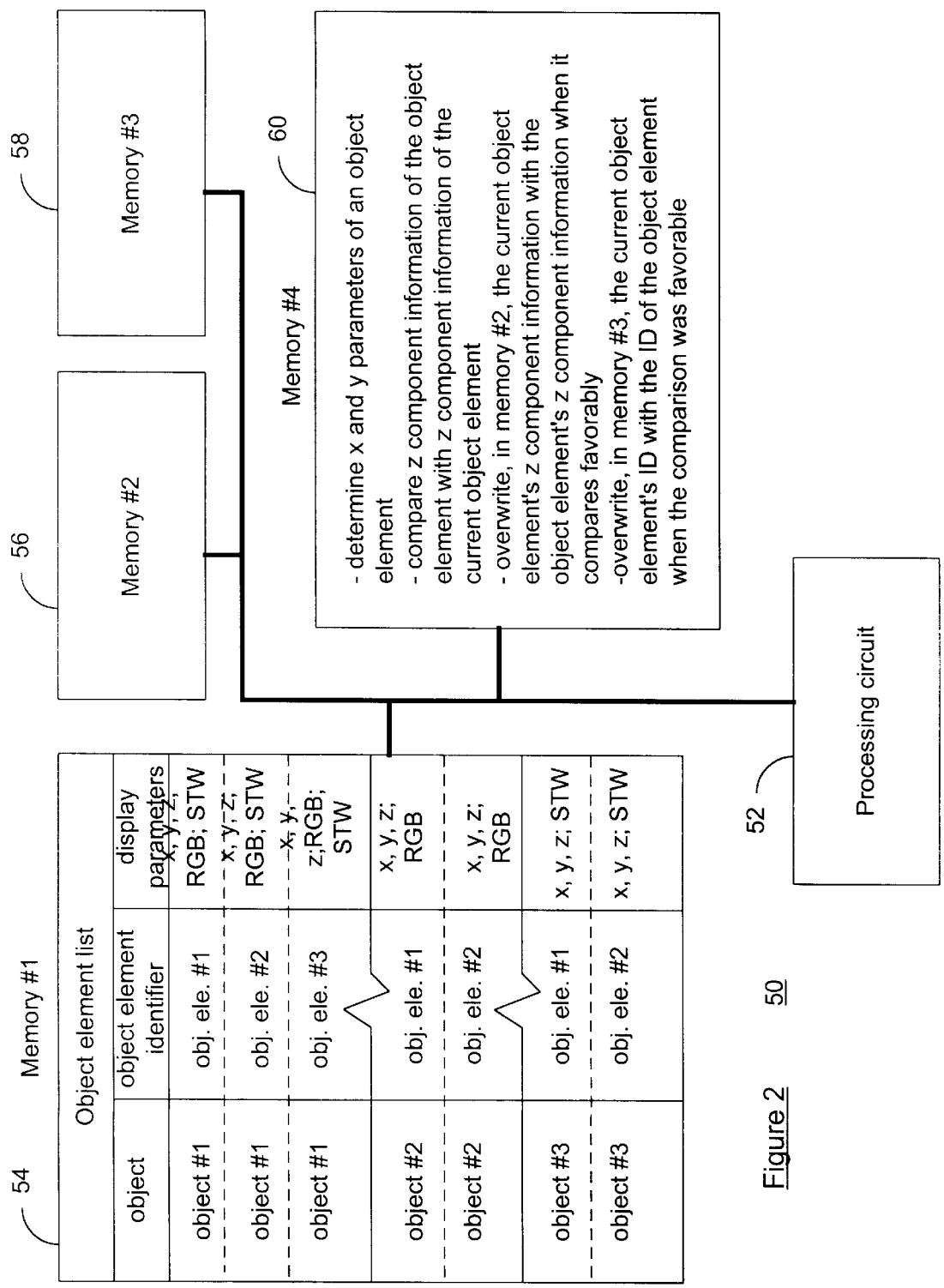
FIG. 2 illustrates a schematic block diagram of a deferred video rendering system which is in accordance with the present invention.

FIG. 2 illustrates a schematic block diagram of a deferred video rendering system 50 which includes a processing circuit 52, a first memory 54, a second memory 56, a third memory 58, and a fourth memory 60. The processing circuit 52 may be a microprocessor, microcomputer, microcontroller, digital signal processor, or any other type of device that manipulates digital data based on programming instructions. The memories 54, 56, 58 and 60 may be random access memory (RAM) or any other type of volatile memory and may be separate memories, may be a single memory, or any combination thereof.

The first memory 54 stores at least a portion of the an object element list and includes fields for object identities, object element identities, and corresponding display parameters for each identified object element. The data shown correlates with the three objects of FIG. 1. As such, object #1 and its object elements are stored in the first series of entries; object #2 and its object elements are stored in the next series of entries; and object #3 and its object elements are stored in the next series of entries. The corresponding display parameters for each object element includes the display parameters of each vertex and for each calculated point within the object element.

Note that the display parameters for each calculated point is done prior to storing in the object element list and is based on the slopes of the object element. This may be done using a general plane equation of $v = S^v_x * x + S^v_y * y + S^v_0$, where v is R, G, B, S, T, W, and Z. To solve for $S^v_x$ and for $S^v_y$ the matrix equation for three vertexes (v1, v2, and v3) can be used:

$$\begin{vmatrix} V_1 \\ V_2 \\ V_3 \end{vmatrix} = \begin{vmatrix} x_1 & y_1 & 1 \\ x_2 & y_2 & 1 \\ x_3 & y_3 & 1 \end{vmatrix} * \begin{vmatrix} S^v_x \\ S^v_y \\ S^v_0 \end{vmatrix}$$

or in the short form: [V]=[P]*[S]. Solving for [S] gives [S]=[P]$^{-1}$ * [V]. In the particular three by three case, detP is only a function of three x, y vertexes and needs to be calculated only once for all 7 parameters (R, G, B, S, T, W, Z). The final equations for slopes $S^v_x$ and $S^v_y$ are:

$$detP = (x_1-x_2)(y_2-y_3)-(x_2-x_3)(y_1-y_2);$$

$$IvnDet = 1/detP;$$

For each parameter, the slopes are:

$$S^v_x = ((y_2-y_3)(v_1-v_2)-(y_1-y_2)(v_2-v_3))*InvDet;$$

$$S^v_y = (-(x_2-x_3)(v_1-v_2)+(x_1-x_2)(v_2-v_3))*InvDet;$$

The value of a pixel at the position x, y can be calculated using:

$$v = S^v_x*(x-x_1)+S^v_y*(y-y_1)+v_1.$$

The display parameters that may be stored in the object element list include the display location of the object element (x, y components), color parameters (Red, Green, Blue parameters), texture parameters (S, T, W parameters). The x, y components, or the pixel location, provide the x and y coordinates, in relation to the display, as to the object's physical location when displayed. The R, G, B parameters indicate the color and/or brightness for a particular point of the object element. The S, T, W parameters indicate the texture coordinates in relation to a video texture map. Note that a video texture map is comprises of a plurality of texels, wherein a plurality of texels are retrieved for any given point of an object element and used to generate the pixel information for that given point. Thus, the present invention avoids retrieval of texels for object elements that are not in the foreground, thereby eliminating unnecessary memory retrievals and pixel information generation.

The second memory 56 stores z component information for each of the object elements and the third memory 58 stores identity of object elements that have z component information stored in the second memory 56. The second and third memories 56 and 58 will be discussed in greater detail below with reference to FIG. 3.

The fourth memory 60, which may be a finite state machine, stores programming instructions that, when read by the processing circuit 52, causes the processing circuit 52 to determine x and y parameters of an object element, which is done based on each particular point of the object element. The x and y parameters of a particular point of the object element are based on where it will physically appear on the display. For example, if the display is a 640 by 480 pixel display, the particular point of the object element may have x and y parameters of 30 for x and 30 for y. Thus, this point would appear in the upper left hand corner of the display. Next, the processing circuit 52 compares the z component of this particular point with z components of the same particular point of a current object element, where the current object element is the one that is currently in the foreground. Thus, for the first z component comparison of the first object element, the first object element will be the current object element. When the z component of another object element is in the foreground with respect to the current object element, the another object element becomes the current object element. Note that the z component ranges in value from 0 (which is the most foreground position) to 1 (which is the most background position).

The processing circuit 52 overwrites the z component of the particular point (pixel location) of the current object element with the z component of the particular point of the other object element when the comparison was favorable, i.e., the other object element is in the foreground with respect to the current object element. In addition to updating the second memory, the processing circuit 52 updates the third memory with the identity of the other object element by overwriting, for this particular point, or pixel, the identity of the current object element. When the processing circuit 52 has compared the z components of each point of each object element, the processing circuit 52 generates pixel information for the object elements identified in the third memory 58 based on the display parameters of the object elements contained in the first memory 54. By generating the pixel information in this manner, the processing circuit 52 does not calculate any unnecessary pixel information, i.e., pixel information for object elements that are overlapped by anther object element. Thus, the processing circuit 52, while now having to maintain the second and third memories, is still more efficient.

Figure 3:
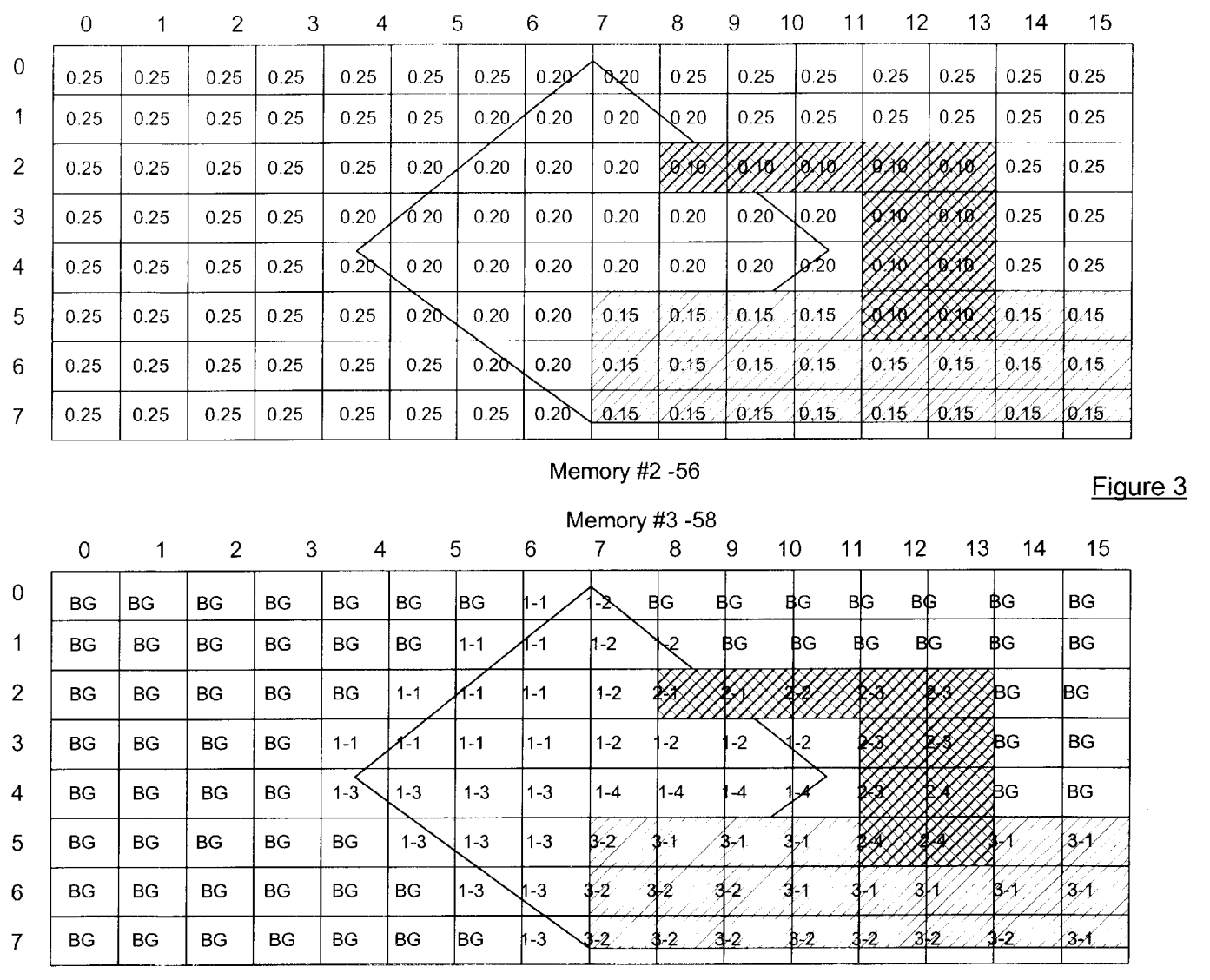

FIG. 3 illustrates a graphical representation of data stored in the second and third memories 56 and 58 of the deferred video rendering system 50. The second memory 56 is shown to include a plurality of entries, each one correlates to a pixel of the tile 18 shown in FIG. 1. The third memory 58 also includes a plurality of entries, each one correlating to a pixel of the tile 18 and correlating to the same memory location in the second memory 56. Thus, the second memory and third memory are 8 by 16 byte memory, where each byte of the second memory 56 stores the z component of the object element that is in the foreground with respect to the other object elements and each byte of the third memory stores the identity of the object element in the foreground. The second memory 56 and third memory 58 initially start with default values or the z component value and identity of a background pattern. In the example, the z component of the background is 0.25 and the identity is BG. Thus, when the processing circuit begins the process previously described, it fills the second memory 56 with the z component (0.25) of the background pattern and fills the third memory 58 with the identity of the background pattern BG.

Next, the processing circuit 52 begins comparing the object elements of object #1 with the background pattern. For each x and y coordinate, or pixel location, that the object elements of object #1 are located, the processing circuit overwrites the background pattern z component and the background identifier with the z component and identifier of the object elements of object #1. Note that the z component of the object elements of object #1 is 0.20 and the identifiers are 1-1, 1-2, 1-3, and 1-4. Recall that the x and y coordinates of each object element is stored in the object element list of the first memory 54. Having made this series of comparisons, the processing circuit 52 repeats the comparisons for the z components of the object elements of object #2 and object #3. When these comparisons are complete, the second and third memories 56 and 58 are data filled as shown. Note that the object elements of object #2 have a z component of 0.10 and identifiers of 2-1, 2-2, 2-3, and 2-4, while the object elements of object #3 have a z component of 0.15 and identifiers of 3-1 and 3-2.

As one skilled in the art will readily appreciate, the second and third memories 56 and 58 will be much larger in practice. For example, each may be a 640 bytes by 480 to accommodate a 640 by 480 display. One skilled in the art will also appreciate that the z component for each object element of an object will not be the same value. Such is the case only when the object is a two dimensional. If there is any perspective to an object, the z components of the object elements will vary accordingly.

Figure 4:
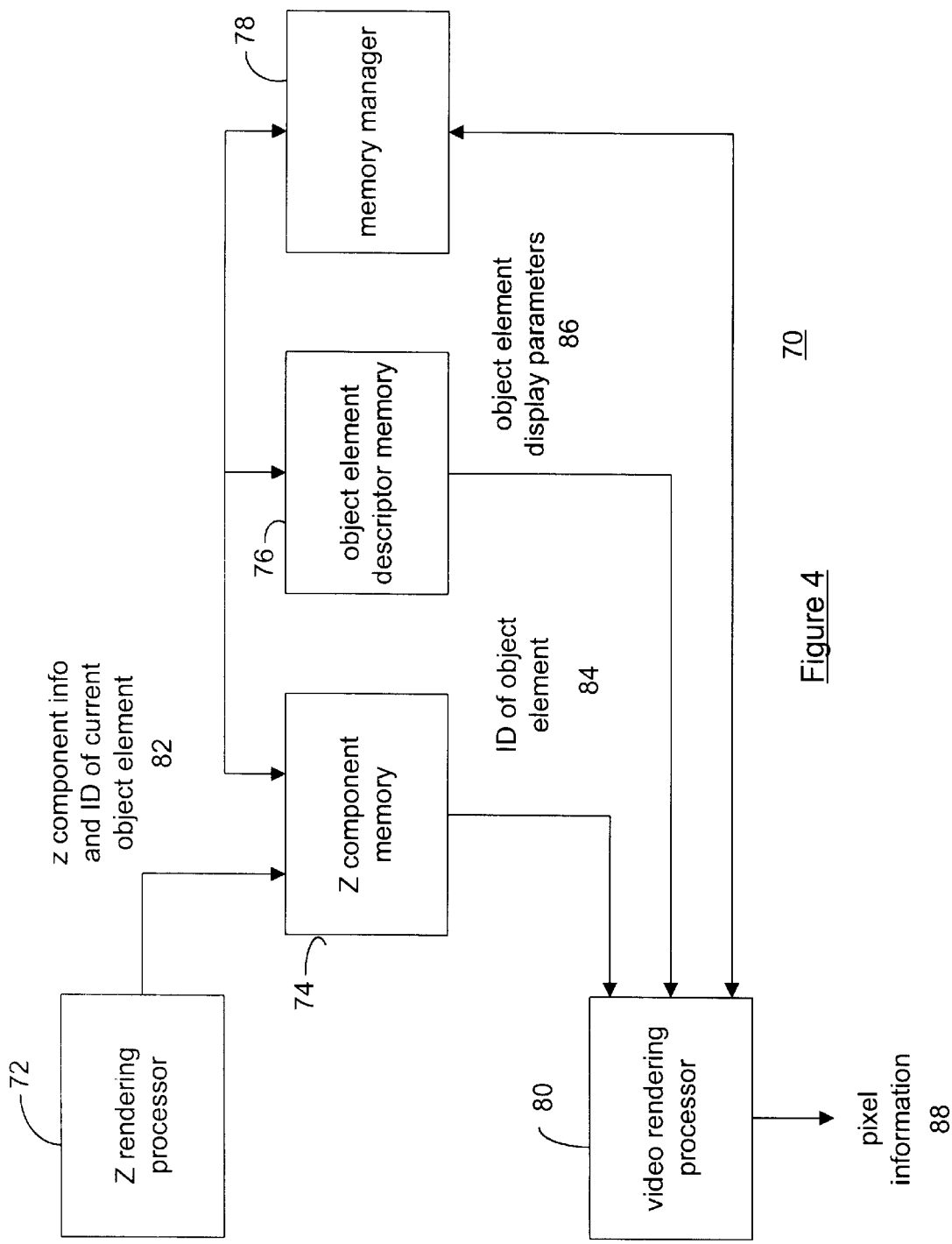
FIG. 4 illustrates a schematic block diagram of an alternate deferred video rendering system which is in accordance with the present invention.

FIG. 4 illustrates a schematic block diagram of an alternate deferred video rendering system 70 which includes a Z rendering processor 72, a Z component memory 74, an object element descriptor memory 76, a memory manager 78, and a video rendering processor 80. The Z rendering processor 72 and the video rendering processor 80 may be separate processing devices or the same and may be one of: a microprocessor, microcomputer, microcontroller, digital signal processor, or any other device that manipulates digital data based on programming instructions. The Z component memory 74 stores the current z component during the comparison process and also stores the object element identifier affiliated with the currently stored z component. The object element descriptor memory 76 stores the object element list, similar to memory 54 of FIG. 2.

In operation, the Z rendering processor 72 compares the z components of each object element stored in the object element descriptor memory 76 and stores the most foreground z component and the identity of affiliated, or current, object element 82 in the Z component memory 74. The Z rendering processor 72 continues the compare and store process until each object element has been compared. Note that the memory manager 78 facilitates storage of respective data in the Z component memory 74 and the object element descriptor memory 76.

Once the z components of all of the object elements have been compared, the video rendering processor 80 reads the ID of the object elements 84 from the Z component memory 74 and, with the assistance of the memory manager 78, retrieves the corresponding object element display parameters 86. The video rendering processor 80 generates pixel information 88 from the display parameters 86 using Equation 1. This is done on a location-by-location (i.e., entry-by-entry) basis until every location has been processed. The video rendering processor 80 renders color information and/or texture information as at least part of the pixel information.

Figure 5:
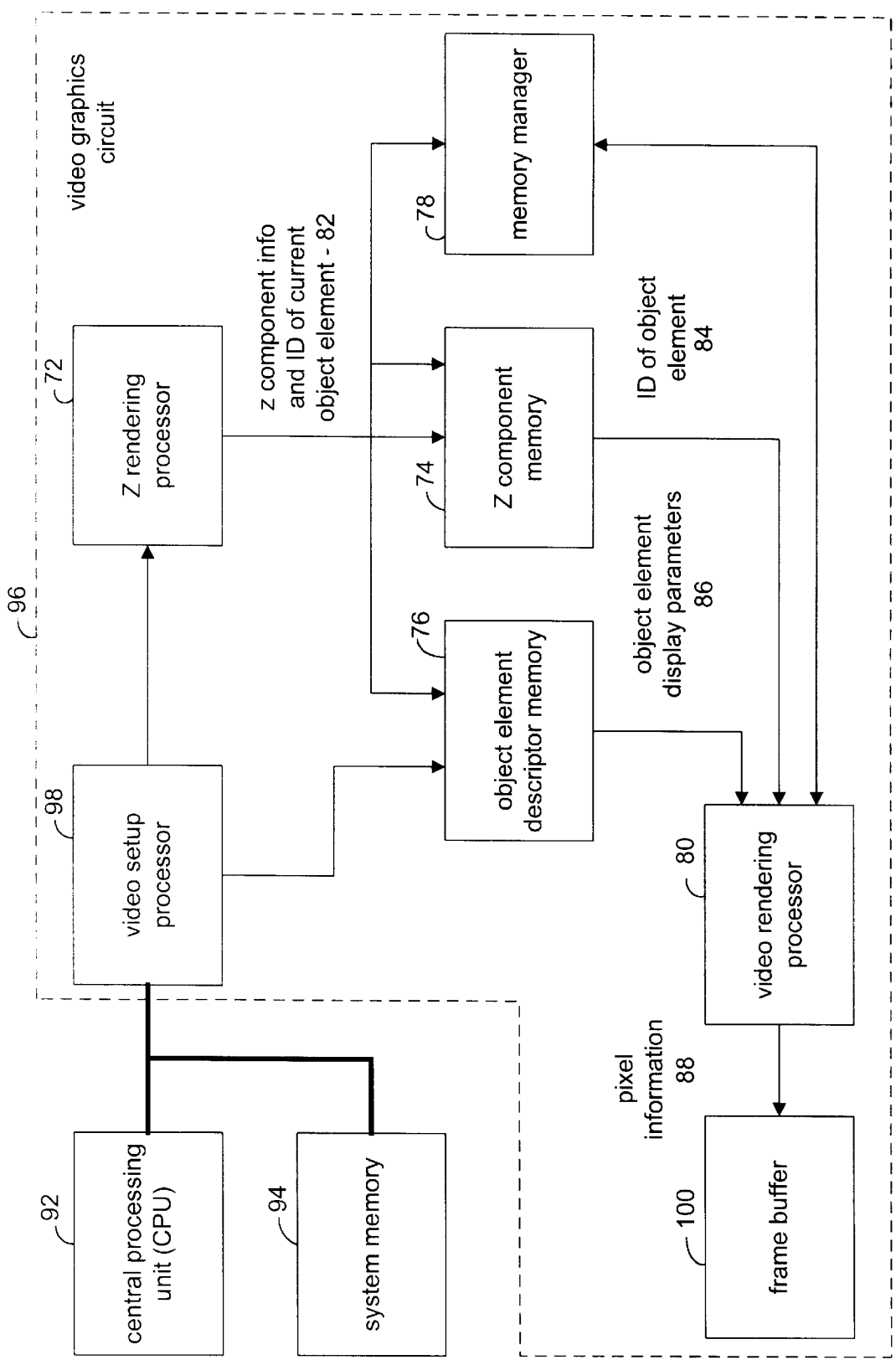
FIG. 5 illustrates a schematic block diagram of a computer system incorporating a deferred video rendering system which is in accordance with the present invention.

FIG. 5 illustrates a schematic block diagram of a computer system 90 incorporating a central processing unit 92, system memory 94, and a video graphics circuit 96. The central processing unit 92 and the system memory 94 are well known in the art, thus no further discussion will be presented except to further illustrate the teachings of the present invention. The video graphics circuit 96 includes a video setup processor 98, the Z rendering processor 72, the Z component memory 74, the object element descriptor memory 76, the memory manager 78, the video rendering processor 80, and a frame buffer 100. The Z rendering processor 72, the Z component memory 74, the object element descriptor memory 76, the memory manager 78, and the video rendering processor 80 operate in a similar manner as discussed with reference to FIG. 4.

The video setup processor 98 performs the slope calculations as previously discussed and provides the object element display parameters to the object element descriptor memory 76. The video setup processor 98, which may be a microprocessor, microcontroller, microcomputer, digital signal processor, or any device that manipulates digital information based on programming instructions, receives video data from the central processing unit 92. The received video data is then processed to produce the object element display parameters. The frame buffer 100 stores the pixel information 88 which is subsequently retrieved for display.

The computing system 90, by incorporating the video graphics circuit 96, is a new system that offers advanced video graphics processing than was available prior to the advent of the present invention. Such a new system is obtained by improving the speed and efficiency of the video rendering processor in that it only generates pixel information for object elements that will be displayed on the screen; not generating pixel information for object elements that would be overlapped by other object elements.

Figure 6:
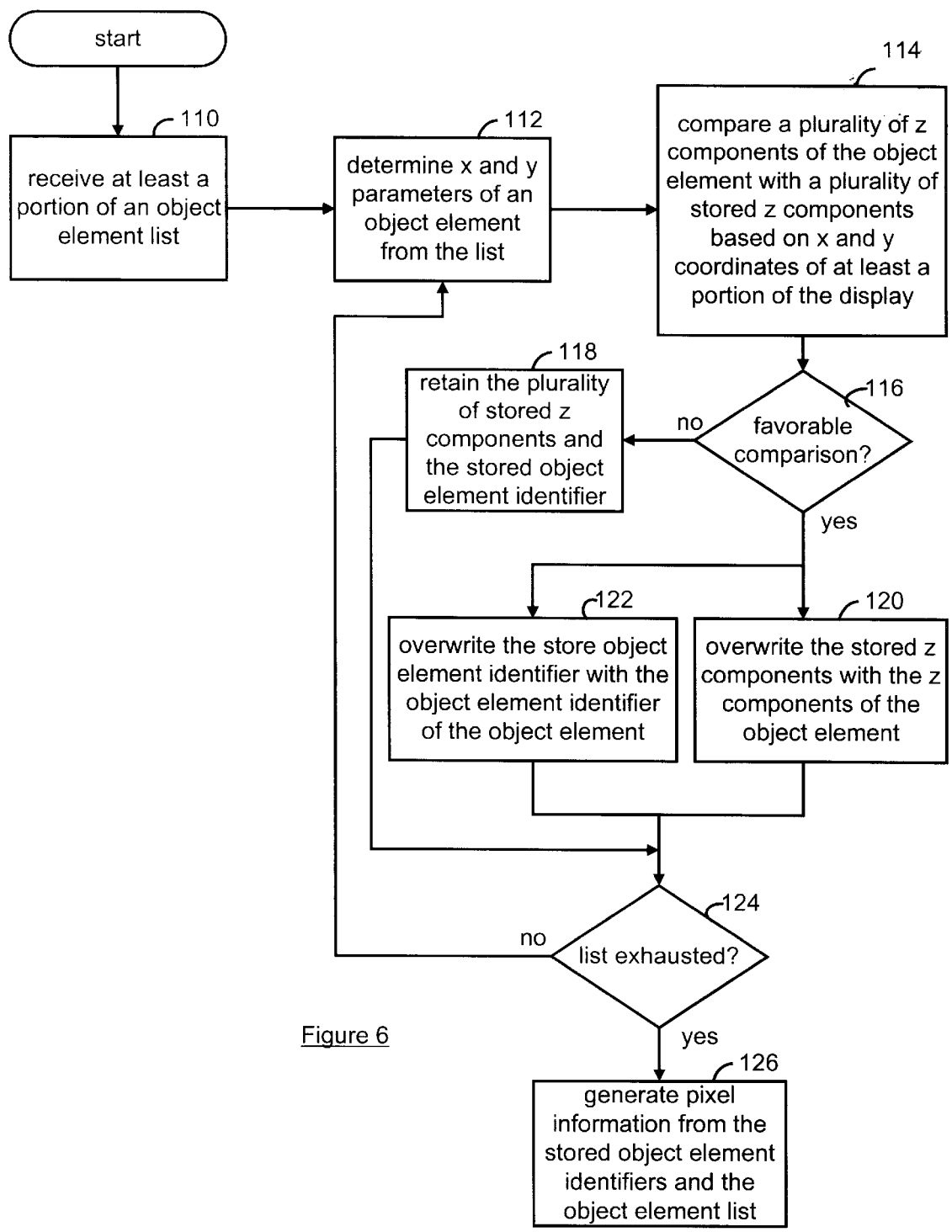
FIG. 6 illustrates a logic diagram that may be used to implement a deferred video rendering system in accordance with the present invention.

FIG. 6 illustrates a logic diagram that may be used to implement a deferred video rendering system. The process begins at step 110 where at least a portion of an object element list is received. As previously mentioned, the object element list stores, for each object element, corresponding display parameters. The process then proceeds to step 112 where x and y parameters of an object element are determined. This determination is done on a pixel location by pixel location basis. The process then proceeds to step 114 where a plurality of z components of the object element are compared with a plurality of stored z components of another object element, which is currently in the foreground with respect to previously compared object elements. Such a comparison is done on a pixel location by pixel location, or x and y coordinates of at least a portion of the display, basis.

If the comparison, as determined at step 116, was not favorable (i.e., the object element is in the background with respect to the current object element), the process proceeds to step 118. At step 118, the plurality of stored z components are retained as well as the corresponding object element identifiers. In other words, the current object element is still in the foreground with respect to the object elements it has been compared with. The process then proceeds to step 124 where a determination is made as to whether the object element list has been exhausted for this portion of the display. If not, the process reverts back to step 112, where the comparison of z components of another object element is begun. If, however, the list is exhausted, the process proceeds to step 126 where pixel information is generated from the stored object element identifiers and the object element list.

If the comparison at step 116 was favorable (i.e., the object element is in the foreground with respect to the current object element), the process proceeds to steps 120 and 122. At step 120, the stored z components of the current object element are overwritten with the z components of the object element. At step 122, the stored object element identifiers of the current object element are overwritten with the object element identifiers of the object element. The process then proceeds to step 124 and continues as previously discussed.

Figure 7:
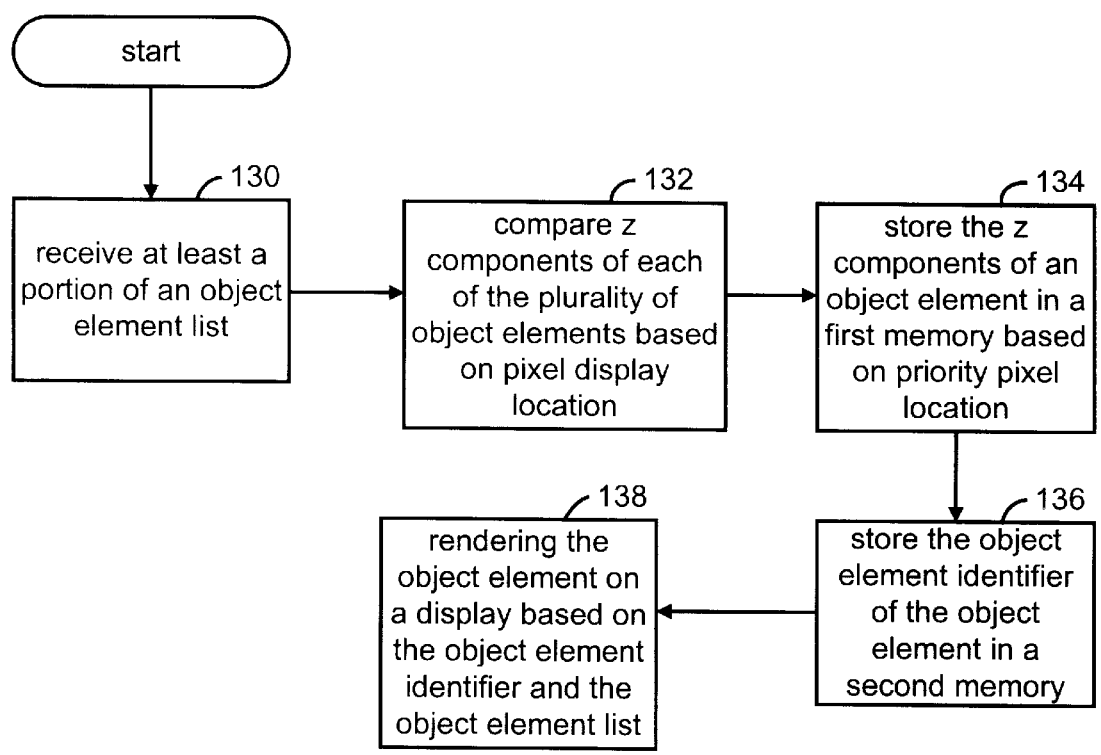
FIG. 7 illustrates a logic diagram that may be used to implement an alternate deferred video rendering system in accordance with the present invention.

FIG. 7 illustrates a logic diagram that may be used to implement an alternate deferred video rendering system. The process begins at step 130 where at least a portion of an object element list is received. Upon receipt, the process proceeds to step 132 where z components of each of a plurality of object elements are compared based on pixel display location of the object elements. The process then proceeds to step 134 where the z components of an object element are stored in a first memory based on priority pixel location (i.e., in the foreground with respect to the other object elements). The process then proceeds to step 136 where the object element identifier of the object element having the priority pixel location is stored in a second memory. The process then proceeds to step 138 where the object element having the priority pixel location is rendered on the display based on the object element identifier and the object element list.

The preceding discussion has presented a method and apparatus for deferred video rendering. The deference occurs because pixel information is not rendered until a foreground relationship is determined (i.e., which object elements will appear on the display and which ones will be overlapped by another). Once this is determined, only the object elements that will appear on the display will be rendered into pixel information. The ones that are overlapped will not be rendered. Thus, no unnecessary rendering of pixel information is performed, thereby improving the overall efficiency of the video rendering system.

We claim:

1. A method for deferred video rendering, the method comprising the steps of:
   a) receiving at least a portion of an object element list, wherein the object element list includes an object element identifier and corresponding display parameters for a plurality of object elements to be displayed in at least a portion of a display;
   b) determining x and y parameters of an object element of the plurality of object elements from the at least a portion of the object element list;
   c) comparing a plurality of z components of the object element with a plurality of stored z components based on x and y coordinates of the at least a portion of the display, wherein the stored z components are stored in a first memory, wherein the entries of the first memory are based on the x and y coordinates;
   d) overwriting a stored z component of the stored z components with a z component of the plurality of z components when the z component compares favorably with the stored z component;
   e) overwriting a stored object element identifier with an object element identifier of the object element when the z component compares favorably with the stored z component, wherein the object element identifier is stored in an entry of a second memory, wherein entries of the second memory are based on the x and y coordinates; and
   f) when the plurality of z components of each of the plurality of object elements has been compared, generating pixel information from the object element identifiers stored in the second memory and the at least a portion of the object element list.

2. The method of claim 1 further comprises, prior to step (a), partitioning the display into a set of tiles, wherein the at least a portion of the display is at least one tile of the set of tiles.

3. The method of claim 1 further comprises receiving color parameters, texture coordinates, slopes of the color parameters, and slopes of the texture coordinates as the corresponding display parameters.

4. The method of claim 1 further comprises, within step (c), utilizing pixel location as the x and y coordinates.

5. The method of claim 1 further comprises, within step (f), rendering color information as at least part of the pixel information.

6. The method of claim 1 further comprise, within step (f), rending texture information as at least part of the pixel information.

7. A method for deferred video rendering, the method comprising the steps of:
   a) receiving at least a portion of an object element list, wherein the object element list includes an object element identifier and corresponding display parameters for each object element of a plurality of object elements;
   b) comparing z components of each of the plurality of object elements based on pixel display location;
   c) storing the z components of one of the plurality of object elements in a plurality of memory locations in a first memory based on priority pixel location, wherein the plurality of memory locations in the first memory are based on the pixel display location;
   d) storing an object element identifier of the one of the plurality of object elements in a plurality of memory locations in a second memory, wherein the plurality of memory locations in the second memory are based on the pixel display location;
   e) rendering the one of the plurality of object elements on a display based on the object element identifier stored in the second memory and the at least a portion of the object element list.

8. The method of claim 7 further comprises, prior to step (a), partitioning the display into a set of tiles, wherein the at least a portion of the display is at least one tile of the set of tiles.

9. The method of claim 1 further comprises receiving color parameters, texture coordinates, slopes of the color parameters, and slopes of the texture coordinates as the corresponding display parameters.

10. A deferred video rendering system comprising:
first memory that stores at least a portion of an object element list, wherein the object element list includes an object element identifier and corresponding display parameters for a plurality of object elements to be displayed in at least a portion of a display;
second memory that stores current z component information of a current object element, wherein memory locations of the second memory correspond with x and y coordinates of the at least a portion of the display;
third memory that stores current object element identifier of the current object element, wherein memory locations of the third memory correspond with the x and y coordinates of the at least a portion of the display;
processing circuit; and
fourth memory that stores programming instructions that, when read by the processing circuit, causes the processing circuit to (a) determine x and y parameters of an object element of the plurality of object elements from the at least a portion of the object element list; (b) compare z component information of the object element with the z component information of the current object element based on the x and y coordinates; (c) overwrite the z component information of the current object element in the second memory with the z component information of the object element when the z component information of the object element compares favorably with the z component information of the current object element; and (d) overwrite an object element identifier of the current object element in the third memory with an object element identifier of the object element when the z component information of the object information compares favorably with the z component information of the current object element.

11. The deferred video rendering system of claim 10 further comprises, the fourth memory storing additional programming instructions that, when read by the processing circuit, causes the processing circuit to generate pixel information from the object element identifier of the current object stored in the third memory and the at least a portion of the object element list when the z component information of each of the plurality of object elements has been compared.

12. A deferred video rendering system comprising:
Z component memory that stores z component information of a current object element and identity of the current object element;
object element descriptor memory that stores display parameters for at least the current object element;
memory manager operably coupled to the Z component memory and the object element descriptor memory, wherein the memory manager coordinates reading and writing operations of the Z component memory and the object element descriptor memory;
a Z rendering processor which, based on programming instructions, determines the z component information of the current object element based on a comparison of z component information; and
a video rendering processor which, based on programming instructions, generates pixel information based on the display parameters of the current object element.

13. The deferred video rending system of claim 12 fuirther comprises the display parameters including color/light parameters and texture parameters.

14. A computing system comprising:
system memory that stores programming instructions and data;
a central processing unit that, from time to time, generates video data when executing the programming instructions; and
a video graphics circuit operably coupled to receive the video data, wherein the video graphics circuit includes:
Z component memory that stores z component information of a current object element and identity of the current object element;
object element descriptor memory that stores display parameters for at least the current object element;
memory manager operably coupled to the Z component memory and the object element descriptor memory, wherein the memory manager coordinates reading and writing operations of the Z component memory and the object element descriptor memory;
a Z rendering processor which, based on programming instructions, determines the z component information of the current object element based on a comparison of z component information; and
a video rendering processor which, based on programming instructions, generates pixel information based on the display parameters of the current object element.

15. The computing system of claim 14 further comprises, within the video graphics circuit, a video setup processor operably coupled to receive the video data, to the Z rendering processor, and to the object element descriptor memory.

16. The computing system of claim 14 further comprises, within the video graphics circuit, a frame buffer operably coupled to store the pixel information.

* * * * *